Figure 1:
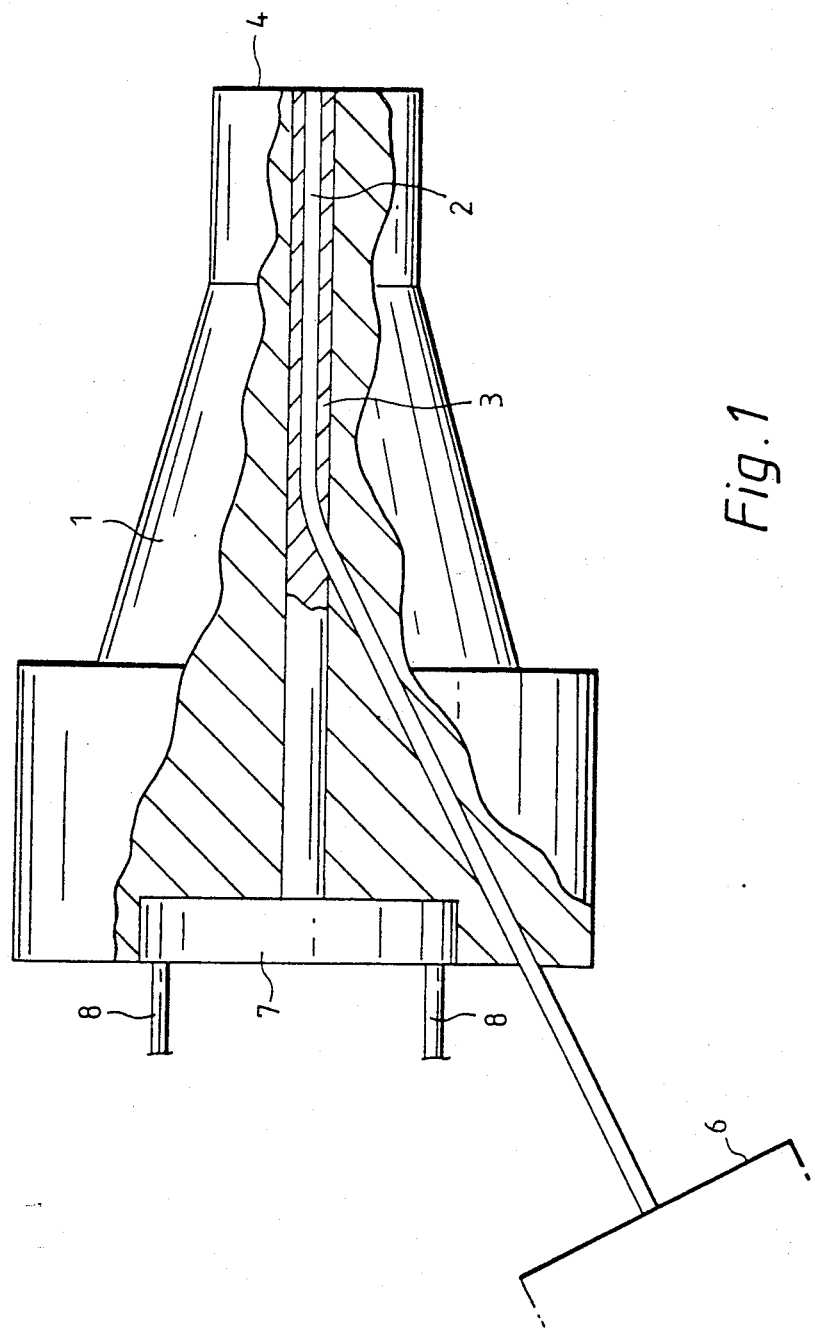

United States Patent [19]

Smith et al.

[11] Patent Number: 4,530,566
[45] Date of Patent: Jul. 23, 1985

[54] OPTICAL FIBER DUPLEX COUPLER

[75] Inventors: Alan M. Smith, Royston; Peter J. Taylor, Cambridge, both of England

[73] Assignee: BICC Public Limited Company, London, England

[21] Appl. No.: 493,406

[22] Filed: May 11, 1983

[30] Foreign Application Priority Data

May 12, 1982 [GB] United Kingdom ............... 8213741

[51] Int. Cl.³ .................................. G02B 7/26
[52] U.S. Cl. ............... 350/96.20; 250/227; 350/96.16; 350/96.33
[58] Field of Search ............ 350/96.15, 96.16, 96.20, 350/96.21, 96.29, 96.30, 96.33; 250/227

[56] References Cited

U.S. PATENT DOCUMENTS

| 4,076,376 | 2/1978 | Slaughter | 350/96.21 |
| 4,237,550 | 12/1980 | Steensma | 350/96.33 X |
| 4,273,413 | 6/1981 | Bendiksen et al. | 350/96.20 |
| 4,279,465 | 7/1981 | Vojvodich | 350/96.20 |
| 4,465,335 | 8/1984 | Eppes | 350/96.21 |

FOREIGN PATENT DOCUMENTS

| 56-156810 | 12/1981 | Japan | 350/96.20 |
| 1493660 | 11/1977 | United Kingdom | |
| 1558643 | 1/1980 | United Kingdom | |
| 2086073 | 5/1982 | United Kingdom | 350/96.20 |

Primary Examiner—John Lee
Attorney, Agent, or Firm—Buell, Ziesenheim, Beck & Alstadt

[57] ABSTRACT

In a simple optical fibre duplex coupler of high light-coupling efficiency, two elongate optical guides are so arranged that, over a part of their lengths extending from one end of the coupler, one optical guide surrounds and is coaxial with the other optical guide with their neighboring end faces lying in a substantially common plane. At a position intermediate the ends of the coupler, the optical guides separate into distinct optical channels. The optical guides are surrounded by and enclosed in a body 1 of a transparent plastics material having a refractive index less than that of the outer optical guide. Preferably, the inner optical guide is a composite optical fibre and the outer optical guide is an elongate body of moulded transparent plastics material having a refractive index greater than that of the material of the cladding of the composite optical fibre.

13 Claims, 2 Drawing Figures

OPTICAL FIBER DUPLEX COUPLER

This invention relates to optical couplers for use in optical transmission systems for the transmission of the ultra-violet, visible and infra-red regions of the electromagnetic spectrum, which regions, for convenience, will hereinafter all be included in the generic term "light", and is concerned especially, but not exclusively, with optical transmission systems for transmission of light having a wavelength within the range 0.4 to 1.9 micrometres.

The simplest form of optical transmission system includes essentially an electro-optical signal emitting transducer (hereinafter, for convenience, referred to as a "transmitter"), an opto-electrical signal detecting transducer (hereinafter, for convenience, referred to as a "receiver") and, interconnecting the transmitter and receiver, a communications link constituted by an optical guide generally, but not necessarily, in the form of an optical fibre cable comprising at least one separate optical fibre and/or at least one optical bundle. More recently, it has been proposed to provide an optical transmission system in which waves of light can be transmitted in opposite directions along the same optical fibre or other optical guide which interconnects a transmitter and receiver at one end of the system and a receiver and transmitter at the other end of the system. Such a "send and receive" optical transmission system must include, at each end of the optical fibre or other optical guide constituting the communications link, coupling means which will both permit light from the transmitter to pass into the optical fibre or other optical guide and light from the optical fibre or other optical guide to pass into the receiver.

It is an object of the present invention to provide, for use in a "send and receive" optical transmission system, an optical coupler in which the light-coupling efficiency between a transmitter or receiver connected to one end of the coupler and an optical fibre or other optical guide connected to the other end of the coupler is substantially greater than in other forms of optical coupler for use in such an optical transmission system hitherto proposed and used.

According to the invention the improved optical coupler comprises two elongate optical guides which are so arranged that, over a part of their lengths extending from one end of the coupler, one of said optical guides surrounds and is substantially co-axial with the other of said optical guides with the neighbouring end faces of the two optical guides lying in a substantially common plane, and that, at a position intermediate the ends of the coupler, said two optical guides separate into distinct optical channels and, surrounding and enclosing said two optical guides, a body of such a material that light will be confined within the outer of said optical guides.

Using this arrangement, the optical connection between the optical coupler and the optical fibre or optical bundle constituting the communications link of an optical transmission system can be a butt-coupling and substantially all the light launched into the inner of the two optical guides can be transferred into this optical fibre or optical bundle. Any light lost at the butt-coupling should be reflected back into the inner optical guide so that cross talk between the transmitter and receiver should be maintained at a very low level.

Preferably, the inner of said two optical guides is a composite optical fibre comprising a core and a cladding, the cladding being of a material having a refractive index lower than that of the material of the core, and this composite optical fibre will be generally used as, and will hereinafter be referred to as, the launching optical fibre.

The outer of said two optical guides is preferably a moulded elongate body of transparent plastics material having a refractive index which is greater than that of the material of the cladding of the launching optical fibre. As a result of this arrangement, in use, light incident on the cladding of the launching optical fibre in the "receiver" mode is not guided but passes through into the surrounding moulded elongate body of transparent plastics material. Alternatively, the outer of said two optical guides may be constituted by a fibre of transparent plastics material having a refractive index which is greater than that of the material of the cladding of the launching optical fibre, the fibre having, over a part of its length, a bore (e.g. formed by drilling) in which the launching optical fibre is a tight fit. In another alternative embodiment, the outer of said two optical guides may be constituted by a plurality of optical fibres assembled around the launching optical fibre, which outer optical fibres, at a position intermediate the ends of the optical coupler, are assembled together to form an optical bundle constituting one of said distinct optical channels.

The body of the optical coupler surrounding and enclosing the said two optical guides is preferably a moulded body of a transparent plastics material having a refractive index lower than that of the material of the outer of said two optical guides, the body being moulded to any desired external transverse cross-sectional shape. In one alternative embodiment, the body of the optical coupler may be of metal or metal alloy, the surface of the metal body bearing against the outer of said two optical guides being highly reflective.

The optical coupler may incorporate, at the end of one or each optical channel, a lens or other means for directing light into, or directing light from, the optical channel and, in this case, each lens may be so encapsulated or otherwise mounted in the moulded body of the optical coupler with respect to the end of the associated optical channel that a high light-transfer efficiency therebetween is permanently ensured.

The optical coupler may also incorporate, in association with one or each of the optical channels, an optical filter. In some circumstances, it may be required to transmit light of two or more frequencies along the communications link of an optical transmission system and in such a case an appropriate optical filter would be associated with each optical channel.

The body of the optical coupler may be contained in a housing of metal or metal alloy which, at each of its ends, may be of such a form that it can be detachably connected to the housing of the other part of a two-part optical connector.

Figure 2:
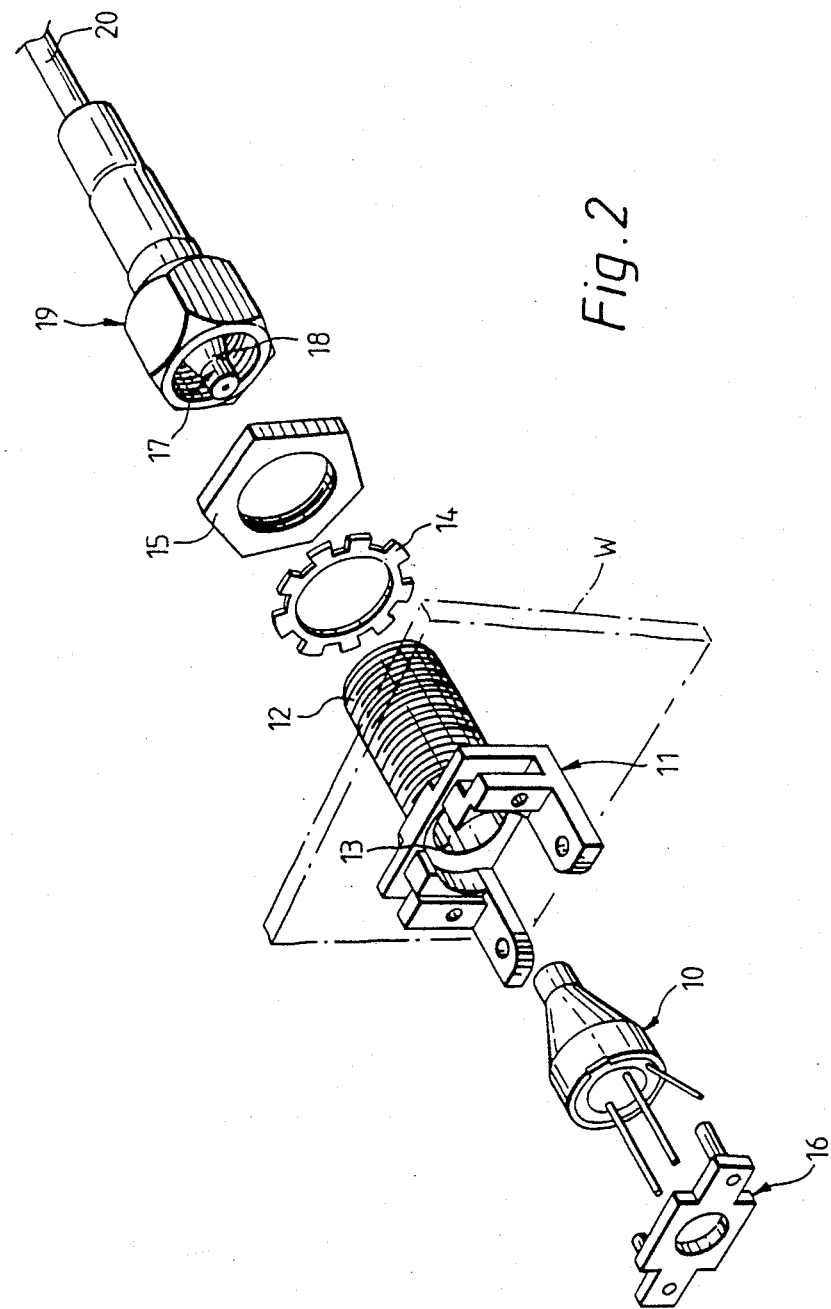

The invention is further illustrated by a description, by way of example, of a preferred optical coupler for use in a "send and receive" optical transmission system, with reference to the accompanying drawings, in which FIG. 1 shows, on a greatly enlarged scale, a sectional side view of the optical coupler, and FIG. 2 shows an exploded view of an optical fibre connector assembly incorporating the optical coupler shown in FIG. 1.

Referring to FIG. 1, the optical coupler comprises a body 1 of circular cross-section and, over a part of its length, of substantially frusto-conical shape, which is made of moulded transparent epoxy resin and in which is embedded a composite optical fibre 2 having a diameter of 140 μm and constituting a launching optical fibre and a rod 3 of moulded transparent acrylic resin having a diameter of 2 mm. At one end 4 of the optical coupler, end faces of the launching fibre 2 and moulded rod 3 lie in a substantially common plane and over a part of the lengths of the launching optical fibre and moulded rod extending from that end, the optical fibre is encapsulated in and substantially coaxial with the moulded rod. At a position intermediate the ends of the body 1, the optical fibre 2 and moulded rod 3 separate into two distinct optical channels, one of which constituted by the composite optical fibre 2 extends at an acute angle out of the body 1 for connection to a transmitter 6 and the other of which, constituted by the moulded rod 3, extends axially within the body 1 and is connected to a receiver 7 which is encapsulated in the body and from which wires 8 extend.

The body 1 of the optical coupler has an overall length of 11 mm. At the end 4 of the optical coupler, the body 1 has a diameter of 2.5 mm; at the other of its ends, the body has a diameter of 7 mm. The body 1 may be contained in a metal housing (not shown) which, at each of its ends, is of such a form that it can be detachably connected to the housing of the other part of a two-part optical connector.

The optical coupler shown in FIG. 1 is especially, but not exclusively, designed for incorporation in an optical fibre connector assembly as shown in FIG. 2, which assembly is manufactured and sold by Amp Incorporated. The connector assembly comprises a bushing 11 including an externally screw threaded sleeve 12 whose bore 13 is of substantially circular cross-section. Over an intermediate part of its length, the bore 13 of the sleeve 12 is of substantially constant diameter and, over parts of its length adjacent said intermediate part, the diameter of the bore increases smoothly and continuously in a direction towards the neighbouring end of the sleeve, the bore being of substantially constant diameter over a part of its length immediately adjacent each end of the sleeve. A nut 15 and associated spring washer 14 are provided for locking the bushing 11 in a hole in wall W of a housing (not shown).

The body 1 of an optical coupler 10 as shown in FIG. 1 effects a mating fit in one end of the bore of the sleeve 12, and the optical coupler is locked in the bushing by a press-on retaining plate 16. The end 4 of the optical coupler 10 positioned within the bore of the sleeve 12 abuts the neighbouring end face of the moulded body 18 of an optical fibre termination 17, which body has an external shape similar to that of the body 1 of the optical coupler.

A composite optical fibre of an optical cable 20 constituting a communications link is embedded in the moulded body 18 of the optical fibre termination 17 with its end face co-planar with the end face of the moulded body. The optical fibre of the communications link has a numerical aperture higher than that of the launching optical fibre 2 and lower than that of the rod 3. This ensures high light coupling efficiency and helps to reduce cross-talk. The optical fibre termination 17 is clamped in the other end of the bore of the sleeve 12 by a tubular ferrule 19 which is secured to the optical cable 20 and which is screwed on to the sleeve 12.

In all cases, it is important to ensure that, in use with any particular communications link, the core of the launching optical fibre has a diameter smaller than the diameter of the core of the composite optical fibre constituting the communications link. Additionally, it is advantageous for the diameter of the cladding of the launching optical fibre to be smaller than the diameter of the core of the composite optical fibre constituting the communications link.

What we claim as our invention is:

1. An optical coupler comprising two elongate optical guides which are so arranged that, over a part of their lengths extending from one end of the coupler, one of said optical guides surrounds and is substantially coaxial with the other of said optical guides with the neighbouring end faces of the two optical guides lying in a substantially common plane, and that, at a position intermediate the ends of the coupler, said two optical guides separate into distinct optical channels and, surrounding and enclosing said two optical guides, a body of such a material that light will be confined within the outer of said optical guides.

2. An optical coupler as claimed in claim 1, wherein the inner of said two optical guides is a composite optical fibre comprising a core and a cladding, the cladding being of a material having a refractive index lower than that of the material of the core.

3. An optical coupler as claimed in claim 2, wherein the outer of said two optical guides is a moulded elongate body of transparent plastics material having a refractive index which is greater than that of the material of the cladding of the composite optical fibre.

4. An optical coupler as claimed in claim 2, wherein the outer of said two optical guides is a fibre of transparent plastics material having a refractive index which is greater than that of the material of the cladding of the composite optical fibre, the plastics fibre having, over a part of its length, a bore in which the composite optical fibre is a tight fit.

5. An optical coupler as claimed in claim 2, wherein the outer of said two optical guides is constituted by a plurality of optical fibres assembled around the inner of said two optical guides, which outer optical fibres, at a position intermediate the ends of the optical coupler, are assembled together to form an optical bundle constituting one of said distinct optical channels.

6. An optical transmission system comprising a communications link constituted by a composite optical fibre comprising a core and a cladding and, connected to each end of the communications link, a transmitter and a receiver, wherein the connection between the transmitter and receiver at at least one end of the communications link is effected by an optical coupler as claimed in claim 2, the core of the composite optical fibre of the optical coupler having a diameter smaller than the diameter of the core of the composite optical fibre constituting the communications link.

7. An optical transmission system as claimed in claim 6 wherein a composite optical fibre constituting the communications link has a numerical aperture which is higher than that of the inner optical guide of the optical coupler and which is lower than that of the outer optical guide of the optical coupler.

8. An optical coupler as claimed in claim 1, wherein the body of the optical coupler surrounding and enclosing the said two optical guides is a moulded body of a transparent plastics material having a refractive index lower than that of the material of the outer of said two optical guides, the body being moulded to any desired external transverse cross-sectional shape.

9. An optical coupler as claimed in claim 8 wherein, at the end of one or each optical channel, means for directing light into, or directing light from, the optical channel is so encapsulated in the moulded body of the optical coupler with respect to the end of the associated optical channel that a high light-transfer efficiency therebetween is permanently ensured.

10. An optical coupler as claimed in claim 1, wherein the body of the optical coupler surrounding and enclosing the said two optical guides is made of metal or metal alloy, the surface of the metal body bearing against the outer of said two optical guides being highly reflective.

11. An optical coupler as claimed in claim 1, wherein, at the end of one or each optical channel, means is provided for directing light into, or directing light from, the optical channel.

12. An optical coupler as claimed in claim 1, wherein, there is provided, in association with one or each of the optical channels, an optical filter.

13. An optical coupler as claimed in claim 1, wherein the body of the optical coupler is contained in a housing of metal or metal alloy which, at each of its ends, is of such a form that it can be detachably connected to the housing of the other part of a two-part optical connector.

* * * * *

UNITED STATES PATENT AND TRADEMARK OFFICE
CERTIFICATE OF CORRECTION

PATENT NO. : 4,530,566

DATED : July 23, 1985

INVENTOR(S) : ALAN M. SMITH, PETER J. TAYLOR

It is certified that error appears in the above-identified patent and that said Letters Patent is hereby corrected as shown below:

Column 2, line 63, after "which" insert --:- --.

Signed and Sealed this

Thirty-first Day of December 1985

[SEAL]

Attest:

DONALD J. QUIGG

Attesting Officer

Commissioner of Patents and Trademarks